United States Patent
Syck et al.

(10) Patent No.: US 10,207,356 B2
(45) Date of Patent: Feb. 19, 2019

(54) EXTENSION ARM FOR ATTACHMENT TO A RESISTANCE WELDING HAND PIECE

(71) Applicant: General Electric Company, Schenectady, NY (US)

(72) Inventors: David Howard Syck, Mableton, GA (US); Kurt Kramer Schleif, Greenville, SC (US)

(73) Assignee: General Electric Company, Schenectady, NY (US)

( * ) Notice: Subject to any disclaimer, the term of this patent is extended or adjusted under 35 U.S.C. 154(b) by 748 days.

(21) Appl. No.: 14/568,635

(22) Filed: Dec. 12, 2014

(65) Prior Publication Data

US 2016/0167159 A1    Jun. 16, 2016

(51) Int. Cl.
*B23K 11/36* (2006.01)
*B23K 11/24* (2006.01)
*B23K 11/31* (2006.01)

(52) U.S. Cl.
CPC .............. *B23K 11/36* (2013.01); *B23K 11/24* (2013.01); *B23K 11/31* (2013.01)

(58) Field of Classification Search
CPC .......... B23K 11/36; B23K 11/31; B23K 11/24

USPC ............................................. 219/108, 117.1
See application file for complete search history.

(56) References Cited

U.S. PATENT DOCUMENTS

| | | | | |
|---|---|---|---|---|
| 2,959,454 A | * | 11/1960 | Du Fresne | B23K 11/31 384/52 |
| 3,641,310 A | * | 2/1972 | Wilson | B23K 9/007 219/127 |
| 4,582,973 A | * | 4/1986 | Richards | B23K 11/105 219/234 |
| 5,115,111 A | * | 5/1992 | Fries | B23K 11/318 219/56.21 |

\* cited by examiner

*Primary Examiner* — Dana Ross
*Assistant Examiner* — Kuangyue Chen
(74) *Attorney, Agent, or Firm* — Eversheds Sutherland (US) LLP

(57) ABSTRACT

An extension arm for attachment to a resistance welding hand piece is disclosed. The extension arm may include an elongated main body extending between a first end and a second end. The first end of the elongated main body may be attachable to the hand piece such that the second end of the elongated main body is spaced apart from the hand piece. The extension arm also may include an electrode extending from the second end of the elongated main body. The electrode may be in electrical communication with the hand piece by way of at least one electrical pathway.

16 Claims, 2 Drawing Sheets

EXTENSION ARM FOR ATTACHMENT TO A RESISTANCE WELDING HAND PIECE

FIELD

The present disclosure relates generally to resistance welding and more particularly relates to an extension arm that is attachable to a resistance welding hand piece.

BACKGROUND

Resistance welding is a thermo-electric process in which heat is generated at the interface of two parts to be joined by passing an electrical current through the parts for a controlled time and under a controlled pressure (also called force). The name resistance welding derives from the fact that the resistance of the work pieces and electrodes are used to generate heat at the interface of the work pieces. Resistance welding can be done quickly, with no consumables (such as brazing materials, solder, or welding rods), to form a reliable joint.

Some resistance welding applications may require the flexibility and versatility of a hand held welding tool. Hand held welding tools, such as pistol grip hand pieces or the like, may allow welding of complex and close proximity geometries. In general, hand held welding tools are easy to use, require low maintenance, and provide a great deal of flexibility. However, the geometry of certain work pieces and spaces may not be compatible for resistance welding using a hand piece alone. The use of a high pressure handle also may be used when an exact known force is required. The high pressure handle may be larger than the pistol grip and cannot access areas requiring the exacting force. Accordingly, there is a need for an attachment that enables the hand piece to be used in these confined workspaces.

BRIEF DESCRIPTION

Some or all of the above needs and/or problems may be addressed by certain embodiments of the present disclosure. According to an embodiment, there is disclosed an extension arm for attachment to a resistance welding hand piece. The extension arm may include an elongated main body extending between a first end and a second end. The first end of the elongated main body may be attachable to the hand piece such that the second end of the elongated main body is spaced apart from the hand piece. The extension arm also may include an electrode extending from the second end of the elongated main body. The electrode may be in electrical communication with the hand piece by way of at least one electrical pathway.

In another embodiment, a system for resistance welding is disclosed. The system may include a resistance welding hand piece. The system also may include an extension arm attachable to the hand piece. The extension arm may include an elongated main body extending between a first end and a second end. The first end of the elongated main body may be attachable to the hand piece such that the second end of the elongated main body is spaced apart from the hand piece. The extension arm also may include an electrode extending from the second end of the elongated main body. The electrode may be in electrical communication with the hand piece by way of at least one electrical pathway.

According to another embodiment, there is disclosed a method for resistance welding. The method may include providing a resistance welding hand piece and attaching an extension arm to the hand piece. The extension arm may include an elongated main body extending between a first end and a second end. The first end of the elongated main body may be attachable to the hand piece such that the second end of the elongated main body is spaced apart from the hand piece. The extension arm also may include an electrode extending from the second end of the elongated main body. The electrode may be in electrical communication with the hand piece by way of at least one electrical pathway.

Other embodiments, aspects, and features of the disclosure will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale.

DETAILED DESCRIPTION

Illustrative embodiments will now be described more fully hereinafter with reference to the accompanying drawings, in which some, but not all embodiments are shown. The present disclosure may be embodied in many different forms and should not be construed as limited to the embodiments set forth herein. Like numbers refer to like elements throughout.

Illustrative embodiments are directed to, among other things, an extension arm for attachment to a resistance welding hand piece. Some resistance welding applications require the flexibility and versatility of a hand held welding tool, such as a pistol grip hand piece or the like. Other types of welding hand pieces may be used herein. The hand piece enables welding of complex geometries quickly and efficiently.

Figure 1:
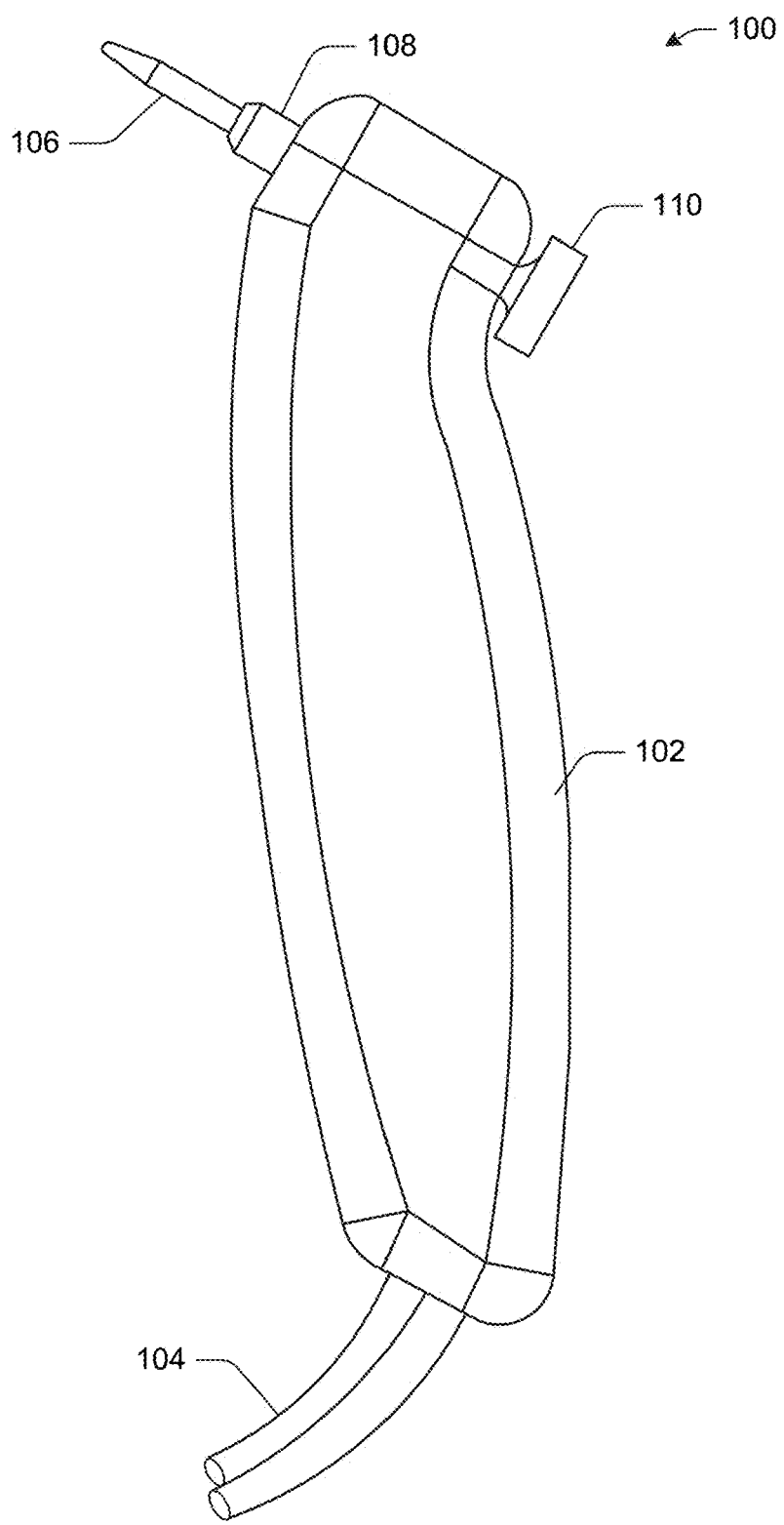
FIG. 1 schematically depicts an example hand piece for resistance welding according to an embodiment.

FIG. 1 depicts a hand piece 100 that may be used herein. In some instances, the hand piece 100 may be a high pressure hand piece. The hand piece 100 may include a handle portion 102, a power supply 104, an electrode 106, and an adjustable pressure element 108. In this matter, a user may hold the hand piece 100 by way of the handle portion 102 to manipulate the electrode 106. For example, the user may press the electrode 106 against the parts to be welded together to apply an electrical current through the parts for a controlled time and under a controlled pressure. In some instances, the electrode 106 may be detachable from the hand piece 100.

In some instances, the electrode 106 may not be activated unless a predetermined pressure is applied thereto. For example, the adjustable pressure element 108 may include a pressure switch or the like. In this manner, in order to activate the electrode 106 and apply an electrical current to the parts to be welded, the user must apply a downward force on the electrode 106 by way of the handle portion 102 to overcome the pressure switch. In some instances, the adjustable pressure element 108 may be adjusted. That is, the user may adjust the pressure required to overcome the pressure switch. For example, the user may twist a knob 110 or the like to increase or decrease the amount of pressure required to overcome the pressure switch. In some types of welding operations, it is essential that the electrode 106 be applied to the parts to be joined with a predetermined pressure to urge the parts together into intimate contact so that the weld will take place in a satisfactory manner. Accordingly, the adjustable pressure element 108 may be adjusted as needed based on the parts to be joined and the particular welding operation.

Figure 2:
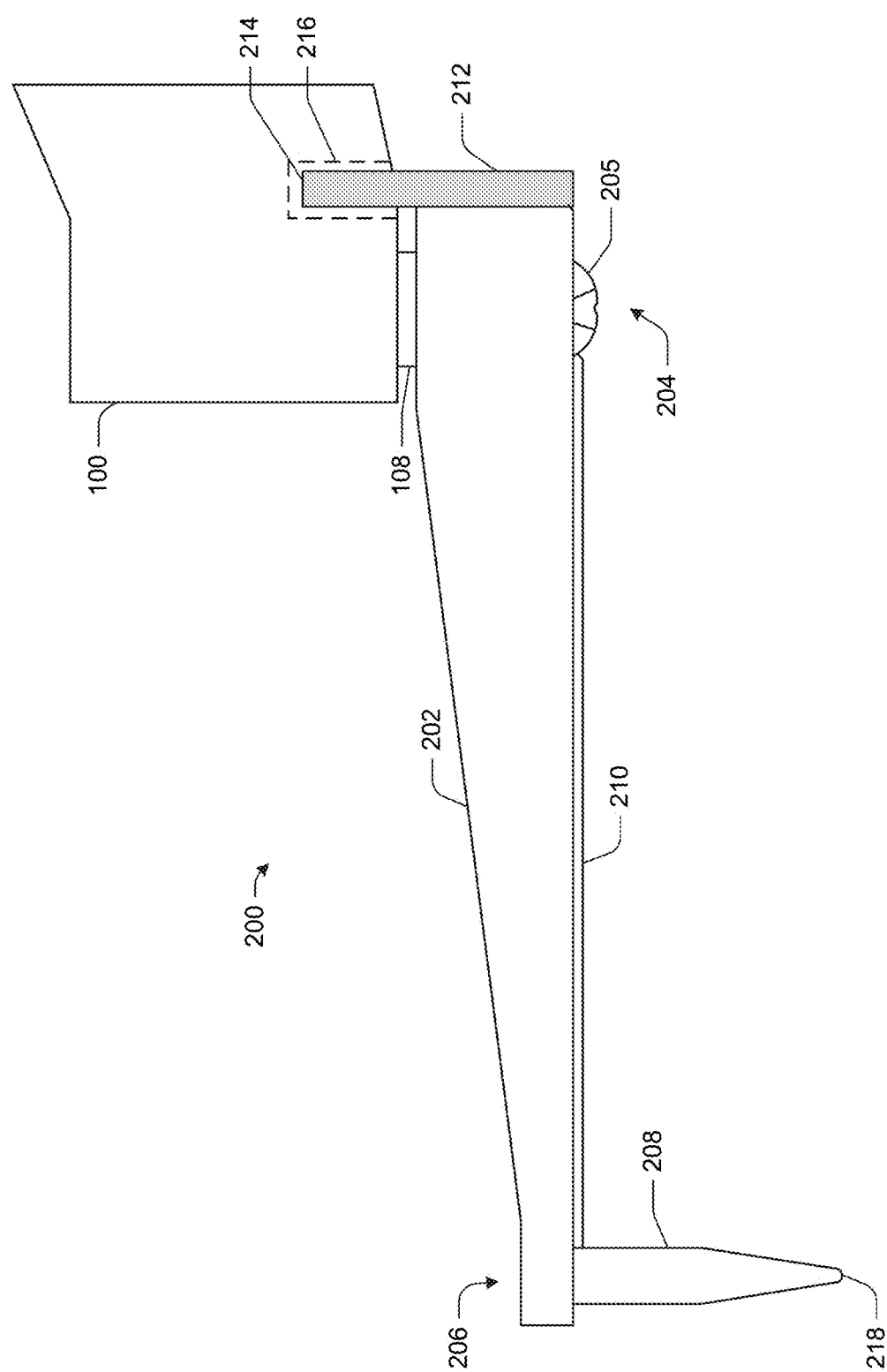
FIG. 2 schematically depicts an extension arm attached to a hand piece for resistance welding according to an embodiment.

FIG. 2 depicts an extension arm 200 for attachment to the hand piece 100. The extension arm 200 may include an elongated main body 202. The elongated may body 202 may extend between a first end 204 and a second end 206. The first end 204 of the elongated main body 202 may be attachable to the hand piece 100 such that the second end 206 of the elongated main body 202 is spaced apart from the hand piece 100. For example, the first end 204 of the elongated main body 202 may be attached (e.g., by way of a screw 205) to the hand piece 100 where the electrode 106 would normally be. In this manner, the electrode 106 may be removed to attach the extension arm 200. In some instances, the first end 204 of the main body 202 may be attached (e.g., screwed) to the pressure element 108 of the hand piece 100.

The extension arm 200 also may include an electrode 208 extending from the second end 206 of the elongated main body 202. The electrode 208 may be detachable from the elongated extension arm 202. The electrode 208 may be in electrical communication with power supply 104 of the hand piece 100 by way of at least one electrical pathway. In this manner, the extension arm 200 enables the hand piece 100 to be used in confined workspaces that would otherwise be inaccessible with the hand piece 100 alone.

In some instances, the at least one electrical pathway may include a wire 210 extending from the first end 204 of the elongated main body 202 to the second end 206 of the elongated main body 202. The wire 210 may be in electrical communication with the hand piece 100 and the electrode 208. The wire 210 may be in communication with the power supply 104 by way of the hand piece 100. The wire 210 may be disposed within the elongated main body 202 or on an exterior of the elongated main body 202. In other instances, the elongated main body 202 may act as the least one electrical pathway between the hand piece 100 and the electrode 208. That is, the elongated main body 202 may be formed of a conductive material and the wire 210 may be omitted.

The extension arm 200 may include a leverage arm 212 extending from the first end 204 of the elongated main body 202 in an opposite direction from the second end 206 of the elongated main body 202. The leverage arm 212 may be attached to the hand piece 100 opposite the second end 206 of the elongated main body 202. The leverage arm 212 may be any suitable shape or configuration. Moreover, the leverage arm 212 may be attached to hand piece 100 in any number of ways, including screws or the like. In some instances, a distal end 214 of the lever arm 212 may fit within a slot 216 in the hand piece 100.

The electrode 208 may extend from the second end 206 of the elongated main body 202 in a substantially transverse direction relative to the elongated main body 202. In some instance, the electrode 208 may include a tack tip 218 distal of the second end 206 of the elongated main body 202. The tack tip 218 may be configured to apply a force to at least one of the parts to be welded together.

In use, a user may attach the extension arm 200 to the hand piece 100. The extension arm 200 may enable the hand piece 100 to be used in confined workspaces that would otherwise be inaccessible with the hand piece 100 alone. The user may grasp the hand portion 102 of the hand piece 100 and maneuver the extension arm 200 into place. For example, the user may place the electrode 208 adjacent to the parts to be welded together. The user may then press the tack tip 218 of the electrode 208 against the parts to be welded together to overcome the pressure switch and activate the electrode 208. If necessary, the user may adjust the adjustable pressure element 108 to ensure that the appropriate pressure is applied to the parts to be welded together.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. An extension arm for attachment to a hand piece of a handheld welding tool for resistance welding, wherein the hand piece comprises a handle portion that is graspable and maneuverable by a user, the extension arm comprising:
   an elongated main body extending between a first end and a second end, wherein the first end of the elongated main body is attachable to the hand piece via a fastener such that the second end of the elongated main body is spaced apart from the hand piece, wherein the elongated main body is tapered from the first end to the second end;
   an electrode extending from the second end of the elongated main body, wherein the electrode is in electrical communication with the hand piece by way of at least one electrical pathway, wherein the electrode is substantially transverse to a longitudinal axis of the elongated main body; and
   a leverage arm extending from the first end of the elongated main body substantially transverse to the longitudinal axis of the elongated main body and in a direction opposite the electrode, wherein a distal end of the leverage arm extends into a slot in the hand piece.

2. The extension arm of claim 1, wherein the at least one electrical pathway comprises a wire extending from the first end of the elongated main body in electrical communication with the hand piece to the second end of the elongated main body in electrical communication with the electrode.

3. The extension arm of claim 1, wherein the elongated main body acts as the least one electrical pathway between the hand piece and the electrode.

4. The extension arm of claim 1, wherein the electrode comprises a tack tip distal of the second end of the elongated main body.

5. The extension arm of claim 1, wherein the electrode will not activate until a predetermined pressure is applied to the electrode by a user holding the hand piece.

6. The extension arm of claim 1, wherein the hand piece comprises an adjustable pressure element within the hand piece.

7. A system for resistance welding, the system comprising:
   a hand piece of a handheld welding tool for resistance welding, wherein the hand piece comprises a handle portion that is graspable and maneuverable by a user; and
   an extension arm attachable to the hand piece, the extension arm comprising:
      an elongated main body extending between a first end and a second end, wherein the first end of the elongated main body is attachable to the hand piece via a fastener such that the second end of the elongated main body is spaced apart from the hand piece, wherein the elongated main body is tapered from the first end to the second end;

an electrode extending from the second end of the elongated main body, wherein the electrode is in electrical communication with the hand piece by way of at least one electrical pathway, wherein the electrode is substantially transverse to a longitudinal axis of the elongated main body; and a leverage arm extending from the first end of the elongated main body substantially transverse to the longitudinal axis of the elongated main body and in a direction opposite the electrode, wherein a distal end of the leverage arm extends into a slot in the hand piece.

8. The system of claim 7, wherein the at least one electrical pathway comprises a wire extending from the first end of the elongated main body in electrical communication with the hand piece to the second end of the elongated main body in electrical communication with the electrode.

9. The system of claim 7, wherein the elongated main body acts as the least one electrical pathway between the hand piece and the electrode.

10. The system of claim 7, wherein the electrode comprises a tack tip distal of the second end of the elongated main body.

11. The system of claim 7, wherein the electrode will not activate until a predetermined pressure is applied to the electrode by a user holding the hand piece.

12. The system of claim 7, wherein the hand piece comprises an adjustable pressure element.

13. A method for resistance welding, the method comprising:

providing a hand piece for resistance welding, wherein the hand piece comprises a handle portion that is graspable and maneuverable by a user; and attaching an extension arm to the hand piece, the extension arm comprising:

an elongated main body extending between a first end and a second end, wherein the first end of the elongated main body is attachable to the hand piece such that the second end of the elongated main body is spaced apart from the hand piece, wherein the elongated main body is tapered from the first end to the second end;

an electrode extending from the second end of the elongated main body, wherein the electrode is in electrical communication with the hand piece by way of at least one electrical pathway, wherein the electrode is substantially transverse to a longitudinal axis of the elongated main body; and a leverage arm extending from the first end of the elongated main body substantially transverse to the longitudinal axis of the elongated main body and in a direction opposite the electrode, wherein a distal end of the leverage arm extends into a slot in the hand piece.

14. The method of claim 13, further comprising applying a downward pressure to the electrode by a user holding the hand piece.

15. The method of claim 14, further comprising activating the electrode when a predetermined pressure is applied to the electrode by the user holding the hand piece.

16. The extension of claim 15, further comprising adjusting the predetermined pressure to activate the electrode.

* * * * *